United States Patent
Scarlata et al.

(10) Patent No.: US 9,974,125 B2
(45) Date of Patent: May 15, 2018

(54) MODULAR INTEGRATED LIGHTING CIRCUIT

(71) Applicant: Cooper Technologies Company, Houston, TX (US)

(72) Inventors: Andrew Francis Scarlata, West Monroe, NY (US); Hui Zhang, Manlius, NY (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 0 days. days.

(21) Appl. No.: 14/801,908

(22) Filed: Jul. 17, 2015

(65) Prior Publication Data

US 2017/0019963 A1 Jan. 19, 2017

(51) Int. Cl.
*H05B 33/08* (2006.01)

(52) U.S. Cl.
CPC ........ *H05B 33/0815* (2013.01); *Y02B 20/343* (2013.01); *Y02B 20/346* (2013.01)

(58) Field of Classification Search
None
See application file for complete search history.

(56) References Cited

U.S. PATENT DOCUMENTS

| 8,197,086 | B2 | 6/2012 | Watanabe et al. | |
|---|---|---|---|---|
| 8,283,868 | B2* | 10/2012 | Lee | F21K 9/00 315/117 |
| 8,766,550 | B1* | 7/2014 | Yoon | H05B 33/083 315/200 R |
| 9,125,261 | B2* | 9/2015 | Reed | H05B 33/0815 |
| 9,277,607 | B2* | 3/2016 | Ramer | H05B 33/0809 |
| 2006/0146553 | A1* | 7/2006 | Zeng | B60Q 3/001 362/488 |
| 2007/0258266 | A1* | 11/2007 | Baek | G02F 1/133603 362/612 |

(Continued)

FOREIGN PATENT DOCUMENTS

| CN | 201145226 Y | 11/2008 |
|---|---|---|
| CN | 202419354 U | 9/2012 |
| WO | 2014/029024 A1 | 2/2014 |

OTHER PUBLICATIONS

International Search Report and Written Opinion from Corresponding Application No. PCT/US2016/041837; dated Oct. 25, 2016.

*Primary Examiner* — Crystal L Hammond
(74) *Attorney, Agent, or Firm* — Pearne & Gordon LLP

(57) ABSTRACT

A light emitting diode (LED) circuit board includes a power input configured to supply power, a driving circuit configured to convert power, and a light emitting circuit configured to generate light. The power input is configured to supply power to the driving circuit. The driving circuit is configured to provide proper power to the light emitting circuit. The light emitting circuit is configured to generate light with the power provided by the driving circuit. An LED circuit board including a driving circuit, a light emitting circuit, and a plurality of semiconductor switches electrically connected between the driving circuit and the light emitting circuit is also provided. Each of the plurality of semiconductor switches is configured to electrically connect and electrically disconnect power from the driving circuit to the light emitting circuit.

8 Claims, 9 Drawing Sheets

(56) References Cited

U.S. PATENT DOCUMENTS

| | | | |
|---|---|---|---|
| 2007/0273299 A1* | 11/2007 | Miskin | H05B 33/0818 315/250 |
| 2009/0121652 A1* | 5/2009 | Kang | G02F 1/1336 315/297 |
| 2009/0251068 A1* | 10/2009 | Holec | F21V 23/005 315/294 |
| 2010/0134047 A1* | 6/2010 | Hasnain | F21V 23/0442 315/302 |
| 2010/0231135 A1* | 9/2010 | Hum | H05B 33/0815 315/250 |
| 2011/0068700 A1* | 3/2011 | Fan | H05B 33/0818 315/185 R |
| 2011/0175528 A1* | 7/2011 | Rains, Jr. | F21K 9/135 315/51 |
| 2011/0221346 A1* | 9/2011 | Lee | H05B 33/0812 315/122 |
| 2011/0227489 A1* | 9/2011 | Huynh | H05B 33/083 315/185 R |
| 2012/0120690 A1 | 5/2012 | Murai | |
| 2012/0154260 A1 | 6/2012 | Decraemer et al. | |
| 2012/0176826 A1* | 7/2012 | Lazar | H02M 3/158 363/126 |
| 2012/0217898 A1* | 8/2012 | Pansier | H05B 33/0815 315/297 |
| 2012/0223650 A1* | 9/2012 | Radermacher | H05B 37/0254 315/200 R |
| 2012/0229037 A1* | 9/2012 | Moskowitz | H05B 33/083 315/192 |
| 2012/0268022 A1* | 10/2012 | Liu | H05B 33/0815 315/192 |
| 2012/0280617 A1* | 11/2012 | Josefowicz | H05B 33/0815 315/85 |
| 2012/0293083 A1* | 11/2012 | Miskin | H05B 33/0809 315/192 |
| 2013/0020951 A1* | 1/2013 | Pollock | H05B 33/0809 315/186 |
| 2013/0026925 A1* | 1/2013 | Ven | H05B 33/0824 315/122 |
| 2013/0134889 A1 | 5/2013 | Chen et al. | |
| 2013/0293126 A1 | 11/2013 | Chen et al. | |
| 2013/0314915 A1* | 11/2013 | Sun | F21V 29/2206 362/235 |
| 2013/0322082 A1* | 12/2013 | Hollander | F21S 2/005 362/249.02 |
| 2013/0334976 A1* | 12/2013 | Lin | H05B 37/02 315/193 |
| 2014/0015424 A1* | 1/2014 | Kraft | H05B 33/0836 315/185 R |
| 2014/0070714 A1* | 3/2014 | Lee | H05B 33/0818 315/186 |
| 2014/0292213 A1* | 10/2014 | Yoon | H05B 33/0821 315/192 |
| 2014/0362071 A1* | 12/2014 | Jung | H05B 33/0824 345/212 |
| 2015/0022106 A1* | 1/2015 | Chiu | H05B 33/0848 315/200 R |
| 2015/0077002 A1* | 3/2015 | Takahashi | H05B 33/0803 315/193 |
| 2015/0091454 A1* | 4/2015 | McRae | H05B 37/0272 315/186 |
| 2015/0312983 A1* | 10/2015 | Hu | F21K 9/1355 315/186 |
| 2016/0178173 A1* | 6/2016 | Yadav | F21S 2/005 362/231 |
| 2016/0234900 A1* | 8/2016 | Bendtsen | H05B 33/0845 |

* cited by examiner

MODULAR INTEGRATED LIGHTING CIRCUIT

BACKGROUND

The subject matter described herein relates to a luminaire and, more specifically, to a low profile luminaire and to a luminaire design. In addition, the subject matter described herein relates to a light engine and a lighting circuit and, more specifically, to a magnetics-free light engine with high performance and a low profile design and to a modular integrated lighting circuit.

In operation, luminaires may generate heat; and due to a proximity of the luminaires to a wall or a ceiling on which the luminaires can be mounted, low profile luminaires may experience a greater rise in temperature than, for example, larger profile luminaires which can have a larger surface area and thus may be able to better dissipate heat. Therefore, in some instances, it can be difficult to use low profile luminaires in environments having, for example, a high ambient temperature. In addition, traditional brackets used for mounting luminaires may make it difficult to mount a luminaire to a wall or ceiling while also maintaining a low profile of the luminaire. These problems can increase an overall shape, dimension, or profile of the luminaire and can also increase costs and manufacturing time of the luminaire.

In addition, when light emitting diodes (LEDs) are used as a light source of the luminaire, the LEDs (or group of LEDs) require a special driver for converting an input electrical power to an electrical power that is suitable for powering the LEDs (or group of LEDs). Therefore, configuring multiple LEDs (or groups of LEDs) requires special attention to the driver needed to power each of the multiple LEDs (or groups of LEDs). As a result, configurations with multiple LED boards can be difficult to modify or scale without undertaking significant redesign, thereby increasing costs and manufacturing time. Such limitations can also make it difficult to interchange LEDs or to dynamically configure an LED luminaire for a desired application. A low profile LED light engine (e.g. an LED driver and LED circuit boards) having high performance characteristics (e.g. high temperature capability, power factor (PF), total harmonic distortion (THD), flicker, reliability, etc.) can also be desirable.

SUMMARY

According to a first example of the disclosure, a light emitting diode (LED) circuit board comprises a power input configured to supply power; a driving circuit configured to convert power; and a light emitting circuit configured to generate light, wherein the power input is configured to supply power to the driving circuit, the driving circuit is configured to convert the supplied power to a converted power and to provide the converted power to the light emitting circuit, and the light emitting circuit is configured to generate light with the converted power.

In various embodiments of the above example, the driving circuit comprises a driver circuit, and wherein the light emitting circuit comprises a plurality of LEDs, wherein the driver circuit is configured to convert the supplied power to the converted power, and wherein the converted power is configured for driving the plurality of LEDs; the supplied power comprises an AC power and wherein the converted power comprises a DC power; the supplied power comprises a DC power and wherein the converted power comprises a DC power; the plurality of LEDs are comprised by a plurality of LED light strings; the LED circuit board further comprises a plurality of semiconductor switches, wherein each of the plurality of semiconductor switches is electrically connected in parallel with at least one corresponding LED light string; each of the plurality of semiconductor switches is configured to at least one of electrically connect and electrically disconnect the converted power from the driver circuit to the corresponding one or more of the plurality of LED light strings based at least in part on a voltage of at least one of the supplied power and the converted power; the LED circuit board is configured to operate at temperatures of greater than about 85° C.; the LED circuit board is configured to comprise a predicted lifetime of more than about 60,000 hours; and/or the driving circuit and the light emitting circuit are on different circuit boards.

According to a second example of the disclosure, a light emitting diode (LED) circuit board comprises a power input configured to supply power to a plurality of LEDs of the LED circuit board; and a power output configured to supply power to at least one other LED circuit board, wherein a quantity of the at least one other LED circuit boards is independent of a circuit for driving the LED circuit board and the at least one other LED circuit board.

In various embodiments of the above example, the LED circuit board further comprises a plurality of semiconductor switches electrically connected between the driving circuit and the light emitting circuit, wherein each of the plurality of semiconductor switches is configured to at least one of electrically connect and electrically disconnect the converted power from the driving circuit to the light emitting circuit; the driving circuit is configured to provide the converted power to the light emitting circuit when one or more of the plurality of semiconductor switches is electrically connected, and wherein the light emitting is configured to generate light with the converted power; the light emitting circuit comprises a plurality of LED light strings, and wherein each of the plurality of semiconductor switches is configured to at least one of electrically connect and electrically disconnect the converted power from the driving circuit to a corresponding one or more of the plurality of LED light strings; the light emitting circuit comprises a plurality of LED light strings, and wherein each of the plurality of semiconductor switches is configured to at least one of electrically connect and electrically disconnect the converted power from the driving circuit to a corresponding one or more of the plurality of LED light strings based at least in part on a voltage of at least one of the power and the converted power; and/or the driving circuit is configured to electrically connect in at least one of series and parallel to another driving circuit of another LED circuit board.

The first and second examples, and their various embodiments, may also be combined in any combination.

DETAILED DESCRIPTION

Figure 1:
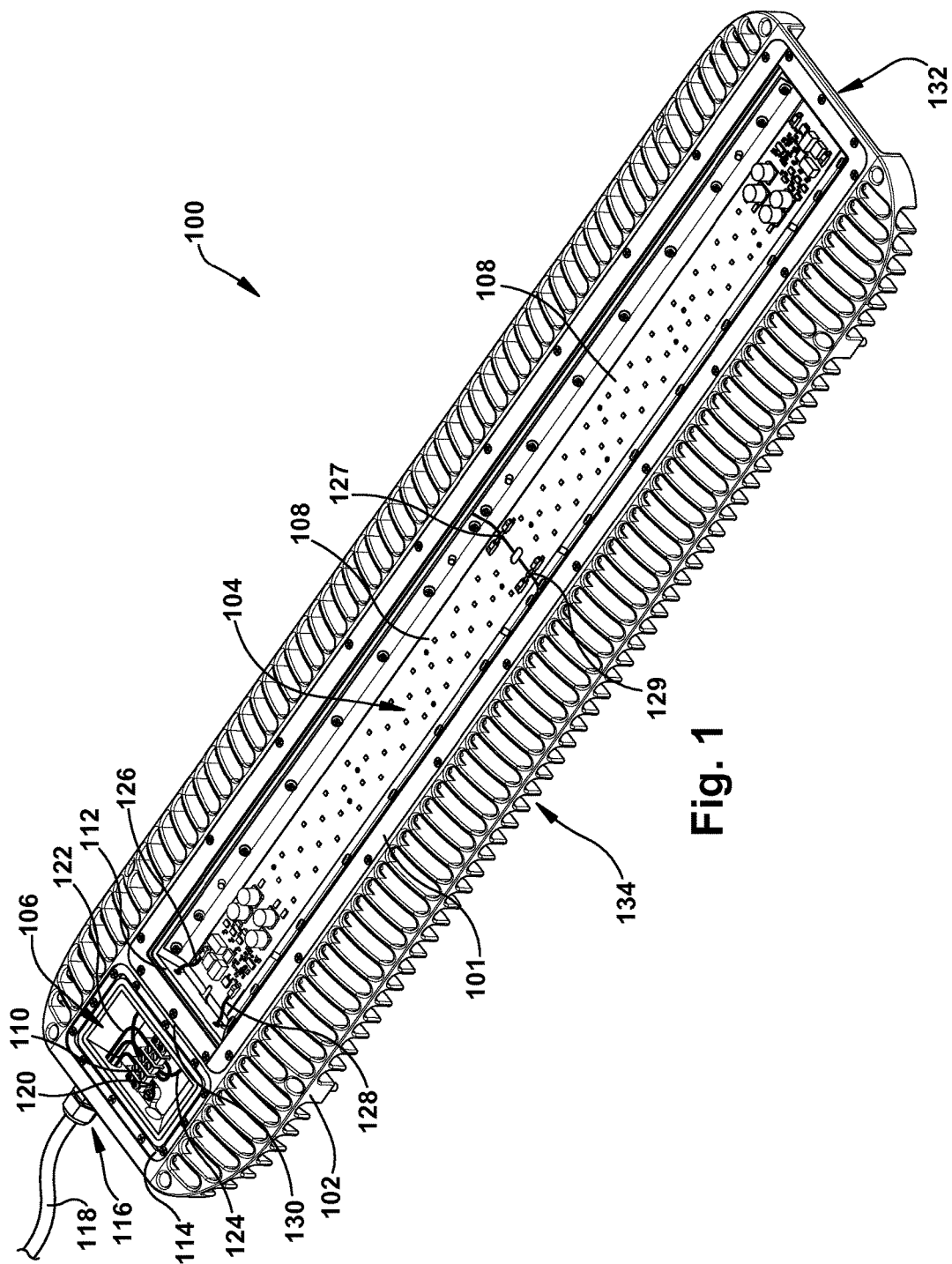
FIG. 1 is a perspective view of a first example luminaire as described herein.

Certain terminology is used herein for convenience and is not to be taken as a limitation on the present application. Relative language used herein is best understood with reference to the drawings, in which like numerals are used to identify like or similar items. Further, in the drawings, certain features may be shown in a somewhat schematic form.

The following aspects described herein are related to a luminaire. While the luminaire is described with respect to a light source including light emitting diodes (LEDs) for illumination, it is to be understood that the aspects described herein could also apply to luminaires with other light sources as forms of illumination or lighting. Additionally, the luminaire may be used for any type of lighting, for example, accent, indicator, general lighting, high bay, modular, flood, linear lighting, and any other type of lighting including those types not explicitly described herein.

Unless otherwise stated, the term "lumens" is to be understood to refer to the standard unit of a measure of the total amount of visible light emitted by a source. In addition, unless otherwise stated, the term "power factor" is to be understood to refer to the standard dimensionless unit of a measure, in the closed interval between −1 and 1, relating to an AC electrical power system defined as the ratio of the real power flowing to the load to the apparent power in the circuit.

According to a first aspect, the luminaires are formed to have a low profile which provides greater flexibility in terms of locations and positions of installation of the luminaires. The subject luminaires also do not exhibit traditional deficiencies such as overheating from their low-profile form. Consequently, the low profile luminaires of the subject application can be employed in environments having a wide range of temperatures, and particularly, in environments having a high ambient temperature. Many structural features of the subject luminaires are described below and contribute to the low profile form as well as to the high temperature tolerance of the luminaires. For example, the luminaires can have a height dimension smaller than a width and a length dimension. In addition, specific mounting elements can employed that minimize bulk and preserve the low profile features of the luminaires even once they have been installed. As a result, the luminaires remain close to a ceiling, wall, or any surface on which they are mounted. Further, the overall structure of the luminaires, including interior components promotes the dissipation of heat generated by the luminaires; thus allowing the luminaires to be fully operable in high ambient temperature environments. The low profile luminaires disclosed herein can also cost less to manufacture than the conventional luminaires.

Figure 2:
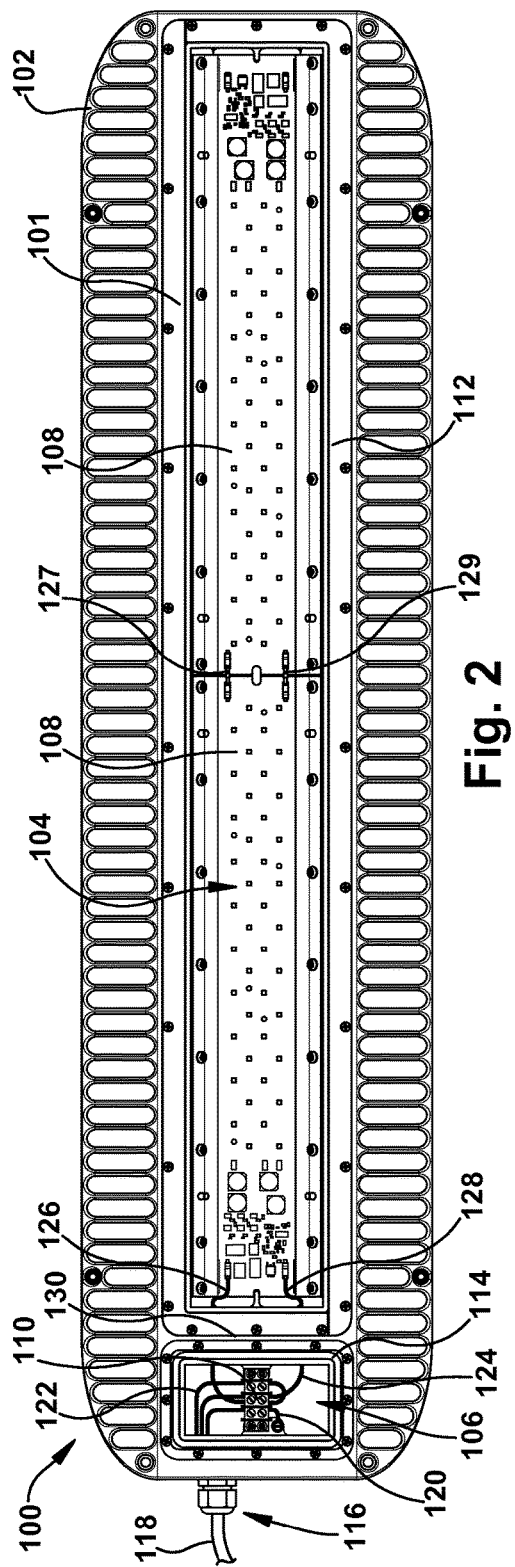
FIG. 2 is a top view of the first example luminaire of FIG. 1 as described herein.
Figure 3:
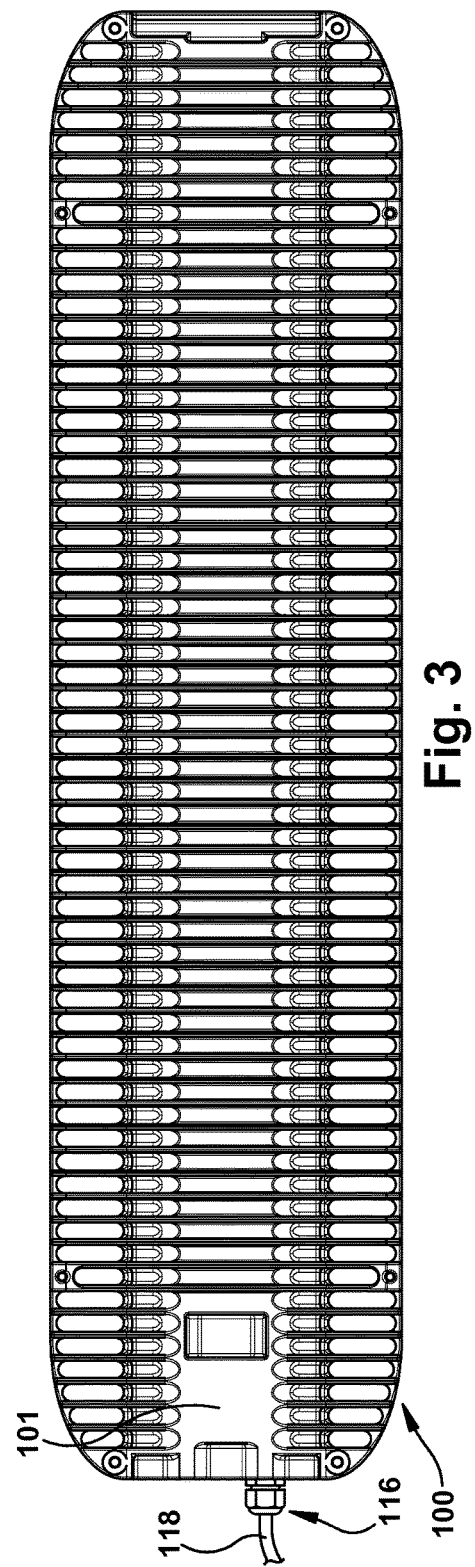
FIG. 3 is a bottom view of the first example luminaire of FIG. 1 as described herein.

A perspective view of a first example luminaire 100 is illustrated in FIG. 1, and a top view and a bottom view of the first example luminaire 100 are illustrated in FIGS. 2 and 3, respectively. The first example luminaire 100 comprises a base 101 having a bezel rim 102. The bezel rim 102 can extend around a portion of an outer periphery of the base 101 or around an entire outer periphery of the base 101. FIG. 1 shows that an edge of the bezel rim 102 can be thinner (e.g. tapered) at an end region 132 of the first example luminaire 100 than at or towards a middle region 134 of the first example luminaire 100.

Figure 9:
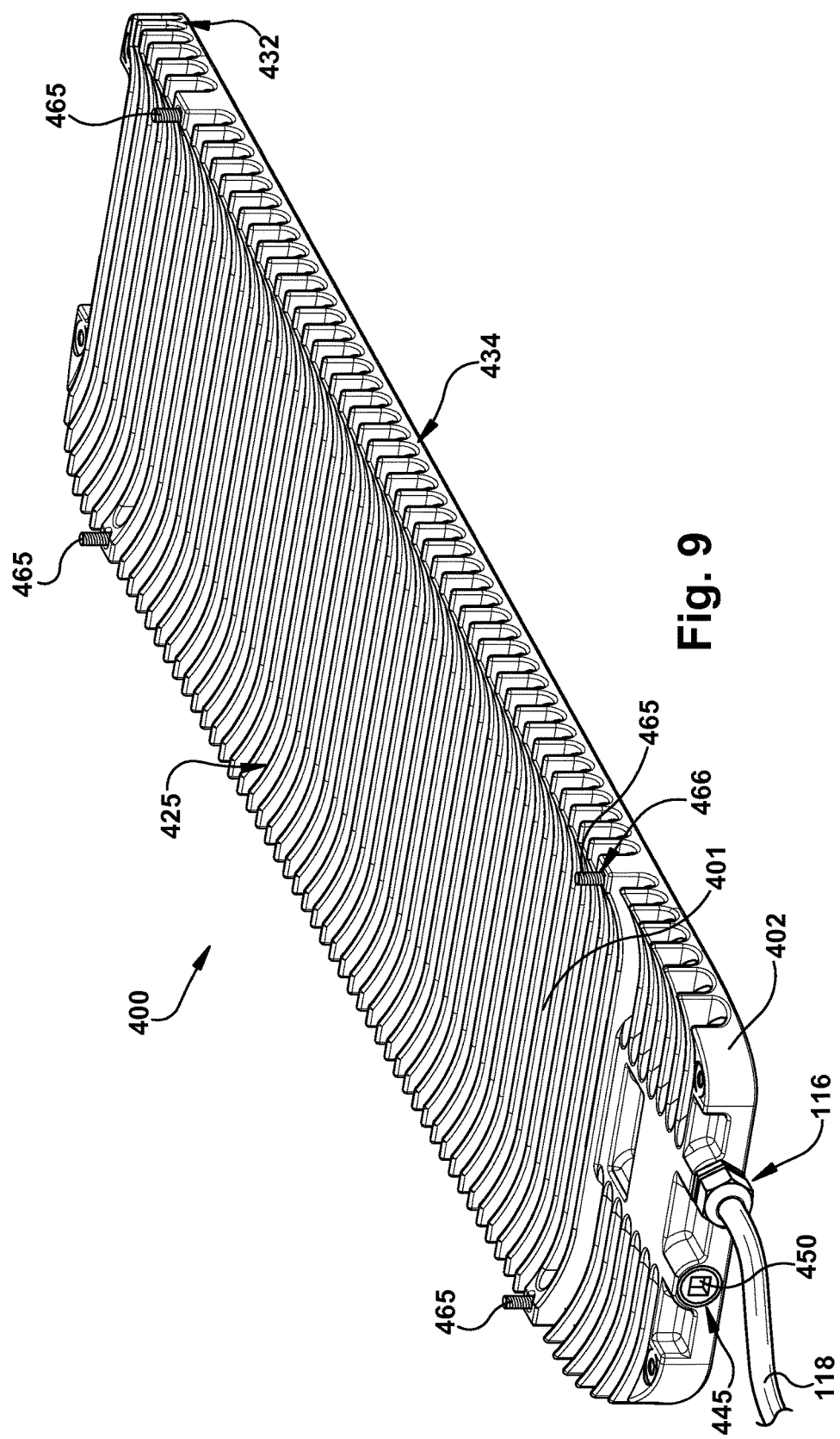
FIG. 9 is a perspective view of a fourth example luminaire as described herein.
Figure 10:
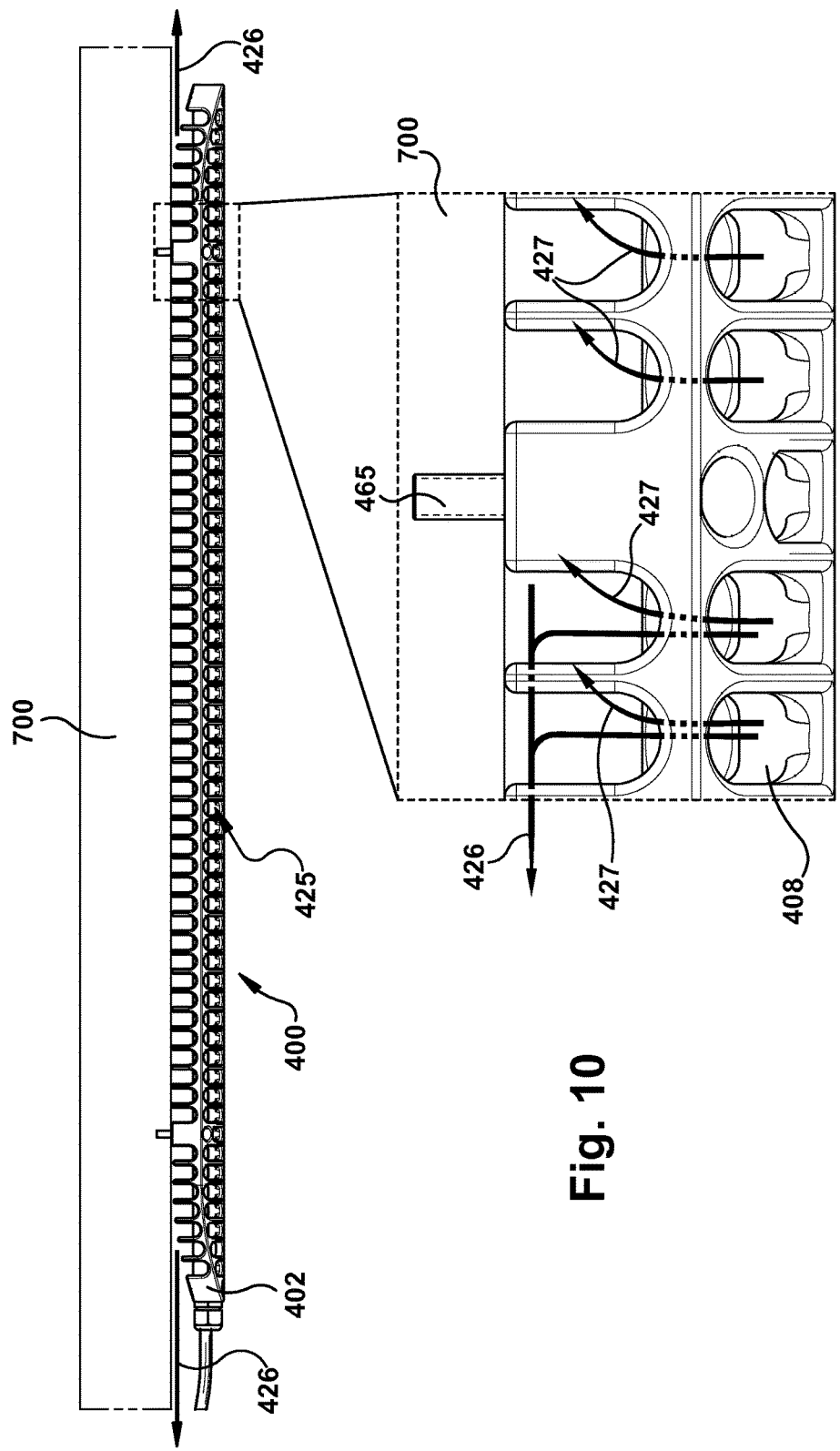
FIG. 10 is a side view of the fourth example luminaire of FIG. 9, mounted to a ceiling, as described herein.
Figure 11:
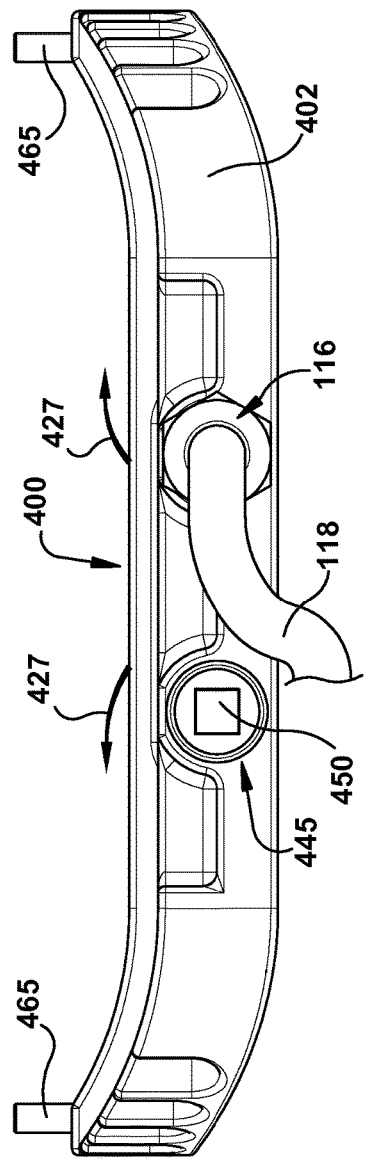
FIG. 11 is a first end view of the fourth example luminaire of FIG. 9, including an input, as described herein.
Figure 12:
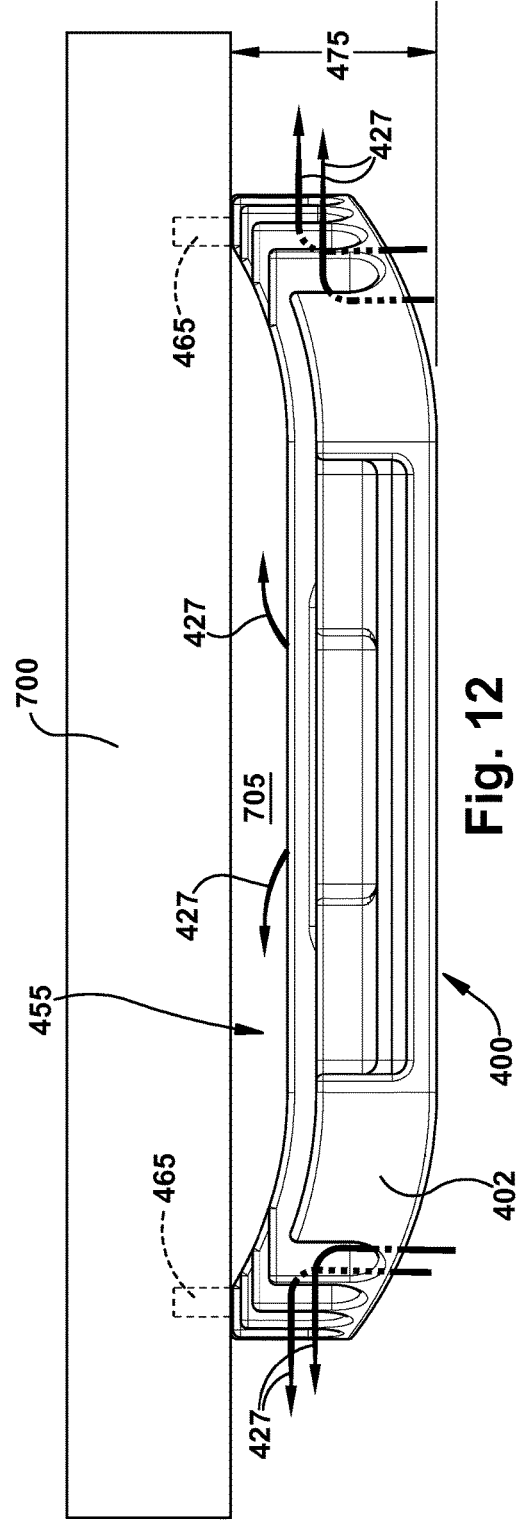
FIG. 12 is a second end view of the fourth example luminaire of FIG. 9, mounted to a surface, as described herein.

In other embodiments, as shown with respect to a second example luminaire 200 (FIG. 4) a bezel rim 202 can be flat and can have a same or similar thickness around a body 201 of the second example luminaire 200. Similarly, as shown with respect to a third example luminaire 300 (FIG. 7), a bezel rim 302 can be flat and can have a same or similar thickness around a base 301 of the third example luminaire 300. As shown in FIG. 9, with respect to a fourth example luminaire 400, a bezel rim 402 can also be thicker at an end region 432 of the fourth example luminaire 400 and thinner (e.g. tapered) at or towards a middle region 434 of the fourth example luminaire 400. FIGS. 11 and 12, which illustrate end views of the fourth example luminaire 400 shown in FIG. 9, demonstrate that a cross section of a base 401 of the fourth example luminaire 400 can be U-shaped. The U-shaped cross-section can include an open channel 455 that is configured to direct a flow of air away from the fourth example luminaire 400. The open channel 455 can extend along a length of the body 401 and direct the flow of air away from the fourth example luminaire 400 at ends thereof as shown by arrows 426 (FIG. 10). It is to be understood that the example luminaires described herein can include any shape, profile, component, or design, including any one or more features of any one or more of the first example luminaire 100, the second example luminaire 200, the third example luminaire 300, and the fourth example luminaire 400 as well as any other feature or element including those features and elements not explicitly disclosed herein.

Turning back to FIG. 1, the first example luminaire 100 can include a lighting compartment 104 and a wiring compartment 106. The lighting compartment 104 houses one or more LED circuit boards 108, and the wiring compartment 106 houses wiring connection terminals 110 (e.g. a terminal block). A wall 130 separates the lighting compartment 104 and the wiring compartment 106. The first example luminaire 100 can also include a lens 112 that covers the lighting compartment 104 including the one or more LED circuit boards 108 and a wiring cover 114 that shields the wiring compartment 106 including the wiring connection terminals 110. As illustrated in FIGS. 1-3, the first example luminaire 100 receives main power at an input 116 from, for example, a cable 118. The input 116 can be located at an end of the first example luminaire 100 near or adjacent to the wiring compartment 106. With this arrangement, wires within the cable 118 can be split to provide power to the one or more LED circuit boards 108 in the lighting compartment 104 using the wiring connection terminals 110 in the wiring compartment 106. The wiring connection terminals 110 can include a plurality of individual terminals to aid in establishing electrical connections between wires of cable 118 and various electrical components of the first example luminaire 100.

It is to be understood that the wiring connection terminals 110 may be formed as any electrical connector including, for example, crimping connectors, screw connectors, blade connectors, and any other electrical connector including those not explicitly described herein. Moreover, it is to be understood that, in some examples, the wiring connection terminals 110 may be optional and may therefore be provided as a convenience to users or to meet certification requirements. Thus, in other examples, a main power (e.g. 120 V AC power) could be wired directly to terminals mounted on the one or more LED circuit boards 108, thus eliminating the need to include the wiring compartment 106 and the wiring connection terminals 110 arranged therein.

Figure 7:
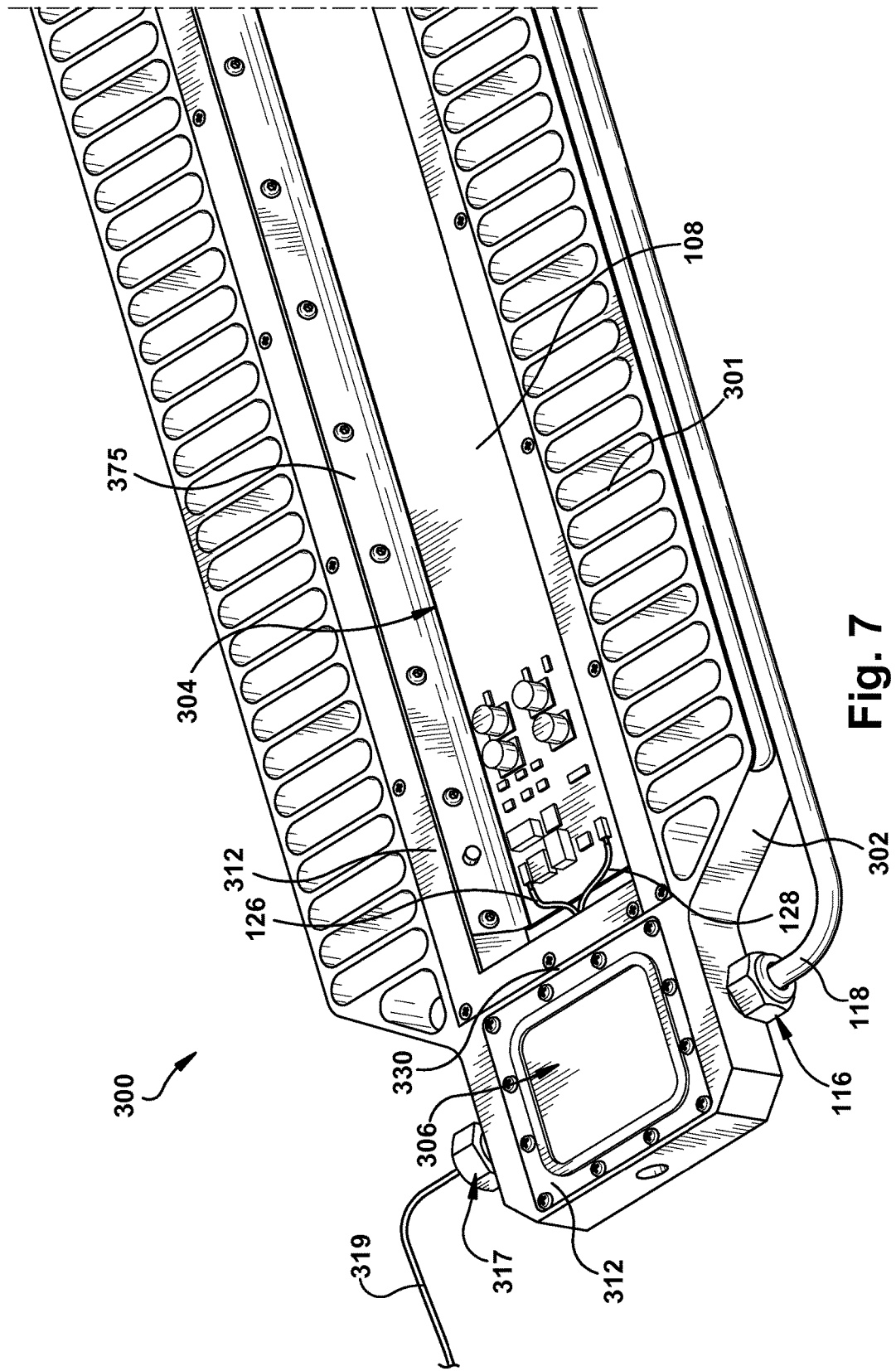
FIG. 7 is a perspective view of a third example luminaire, including a clamping plate, as described herein.

Further, the first example luminaire 100 can be electrically connected to one or more additional luminaires (e.g. one or more luminaires that are the same as or similar to the first example luminaire 100 and/or one or more luminaires that are different than the first example luminaire 100, such as any one or more of the second example luminaire 200, the third example luminaire 300, and the fourth example luminaire 400, as well as any other luminaire including those luminaires not explicitly disclosed herein) by passing a wire or cable from the first example luminaire 100 to the one or more additional luminaires. For example, as shown in FIG. 7 with respect to the third example luminaire 300, an additional wire 319 can pass in or out of an additional conduit entry 317 on the third example luminaire 300 to provide or supply electrical power (e.g. from cable 118 through input 116) and to electrically connect multiple luminaires together. Such a configuration can refer to a loop-in/loop-out wiring arrangement of the luminaire. In other examples, when not utilized, a plug (e.g. a square drive plug 450 shown in FIGS. 9 and 11 with respect to the fourth example luminaire 400) can be inserted into an additional conduit entry 445 located on the fourth example luminaire 400.

A wiring configuration of the first example luminaire 100 will now be described with the understanding that such wiring configuration can apply in a same or similar manner to any one or more of the example luminaires disclosed herein, including the second example luminaire 200, the third example luminaire 300, and the fourth example luminaire 400. As shown in FIG. 1, the wiring connection terminals 110 of the first example luminaire 100 can be used to connect a ground wire 120 of the cable 118 to a first terminal that is electrically connected to a ground node of the first example luminaire 100. In addition, a positive (e.g. "hot") wire 124 of the cable 118 can be connected to a second terminal that is electrically connected to a positive side of the LED circuit board 108. A negative or neutral wire 122 of the cable 118 can be connected to a third terminal that is electrically connected to a negative or neutral side of the LED circuit board 108. The second and third terminals can be electrically connected to the LED circuit board 108 which can be located in, for example, the lighting compartment 104 of the first example luminaire 100 by passing a corresponding positive connection wire 128 and a corresponding negative or neutral connection wire 126 through one or more passages in the wall 130 between the wiring compartment 106 and the lighting compartment 104. As will be discussed more fully below, the corresponding positive connection wire 128 and the corresponding negative or neutral connection wire 126 can connect to an LED light engine 500, as shown in FIG. 5.

Figure 4:
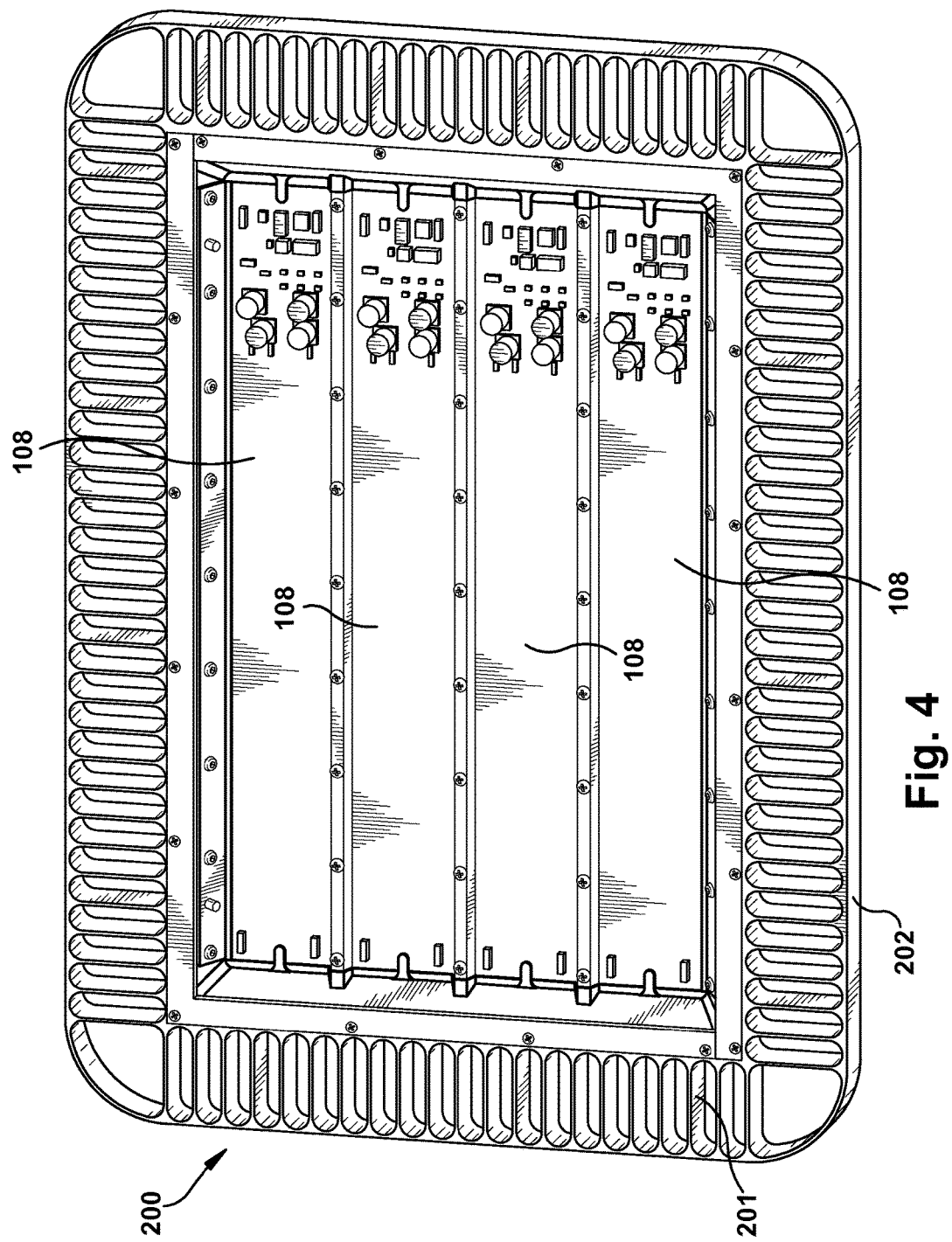
FIG. 4 is a perspective view of a second example luminaire as described herein.
Figure 5:
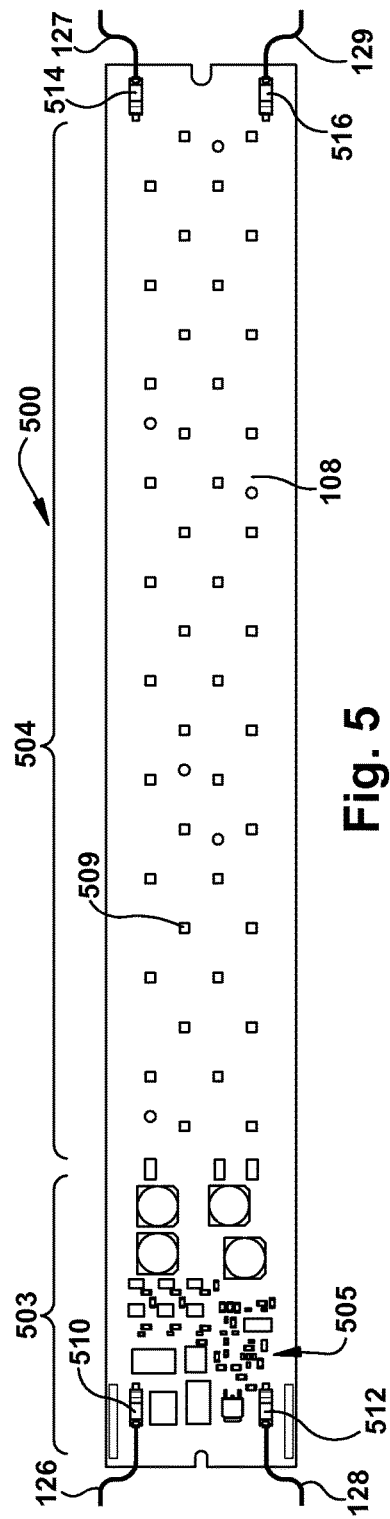
FIG. 5 illustrates an example LED light engine as described herein.
Figure 8:
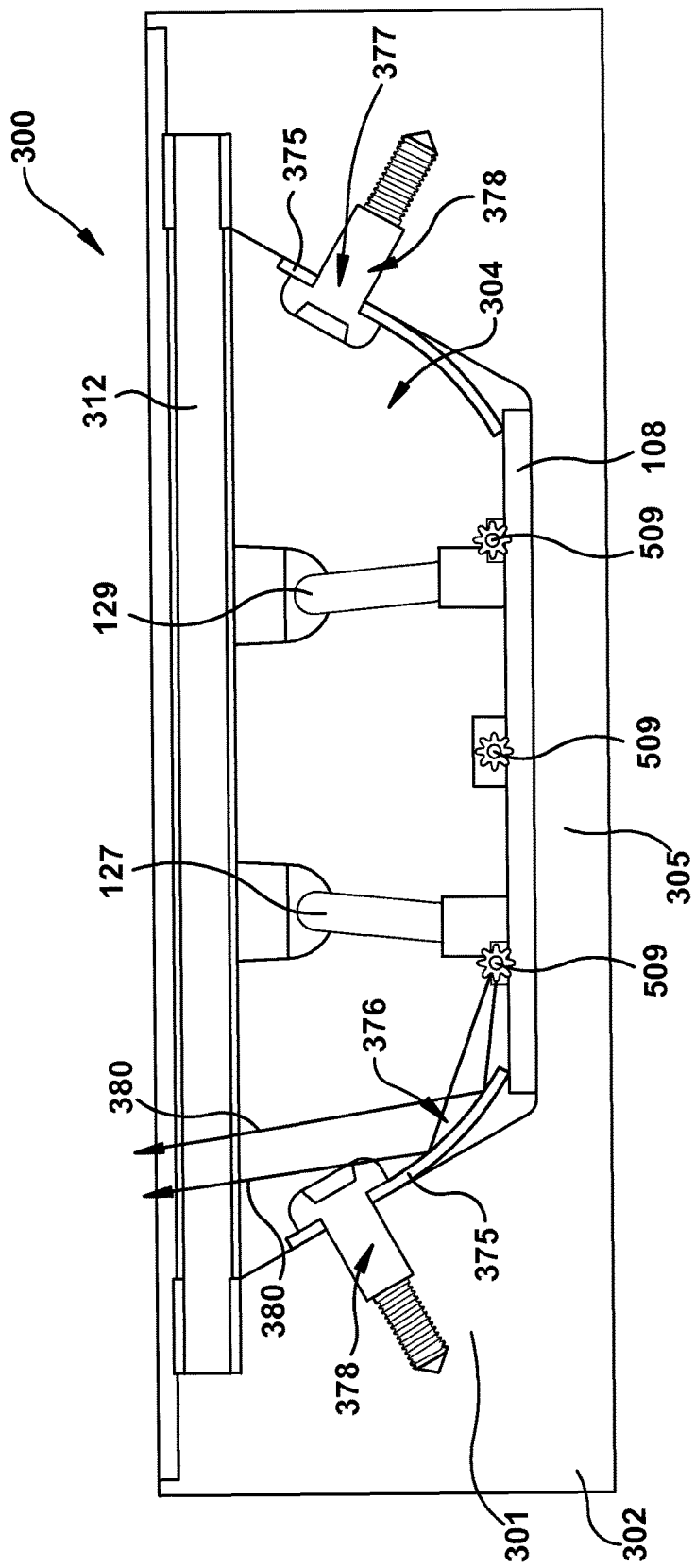
FIG. 8 is a cross-sectional view of the third example luminaire of FIG. 7, including a clamping plate, as described herein.

In addition, a plurality of LED circuit boards 108 can be physically and electrically connected to each other according to any desired configuration using a negative or neutral connector 127 and a positive connector 129 (shown in FIGS. 1 and 2 with respect to the first example luminaire 100, FIG. 5 with respect to the LED light engine 500, and FIG. 8 with respect to the third example luminaire 300). Such modularity and flexibility in terms of connecting one or more LED circuit boards 108 together within a single luminaire allows for scaling of multiple independent LED circuit boards to provide any size, shape, combination, or arrangement of luminaires and corresponding lights. For example, the first example luminaire 100, illustrated in FIGS. 1-3, shows two LED circuit boards 108 arranged in series while the second example luminaire 200, illustrated in FIG. 4, shows four LED circuit boards 108 arranged in parallel to provide, for example, a high bay luminaire. Still other designs, configurations, and light levels are achievable by using the same or similar internal electrical components (e.g. LED circuit board 108) in various configurations, including configurations not explicitly disclosed herein.

Turning to FIG. 5, the LED light engine 500 is shown. The LED light engine 500 includes the LED circuit board 108 and a drive circuit 505. The LED circuit board 108 can be formed as a printed circuit board (e.g. PCB) and includes a substrate having a plurality of lighting elements (e.g., individual LEDs 509) configured to provide illumination when powered. It is to be understood that the LED circuit board 108 of the LED light engine 500 can be the same as or similar to the LED circuit board 108 described herein and as shown with respect to the first example luminaire 100, the second example luminaire 200, and the third example luminaire 300. Moreover, it is to be understood that the LED light engine 500 can be employed in any one or more of the example luminaires described herein as well as any other lighting fixture or structure including those lighting fixtures and structures not explicitly disclosed herein.

In addition, the LED light engine 500 includes a driving circuit region 503 and a light emitting region 504. The drive circuit 505 (e.g. magnetics-free drive circuit discussed below) is mounted to the LED circuit board 108 in the driving circuit region 503; and the LEDs 509 (e.g. individual light emitting diodes) are mounted to the LED circuit board 108 in the light emitting region 504. Power in and out connections 510, 512, 514, 516 (each having positive/hot and negative/neutral connectors) are also mounted at both ends of the LED circuit board 108—for example, at the driving circuit region 503 and at the light emitting region 504, respectively. The power in and out connections 510, 512, 514, 516 can be, for example, pin connectors electrically and physically connected to corresponding wires and connectors. For example, with respect to the first example luminaire 100 discussed above, the negative or neutral connection wire 126 and the positive connection wire 128 can connect to the respective power in and power out connections 510, 512 at the driving circuit region 503 of the LED light engine 500. Similarly, the negative or neutral connector 127 and the positive connector 129 can connect to the respective power in and power out connections 514, 516 at the light emitting region 504 of the LED light engine 500. The connection wires 126, 128 and connectors 127, 129 can physically and electrically connect a plurality of LED circuit boards 108 according to any desired configuration. It is also possible for the power in and out connections 510, 512, 514, 516 to be positioned at locations other than at the ends of the LED circuit board 108 to support various desired physical configurations of a plurality of LED circuit boards 108 connected either in series or in parallel.

Figure 6:
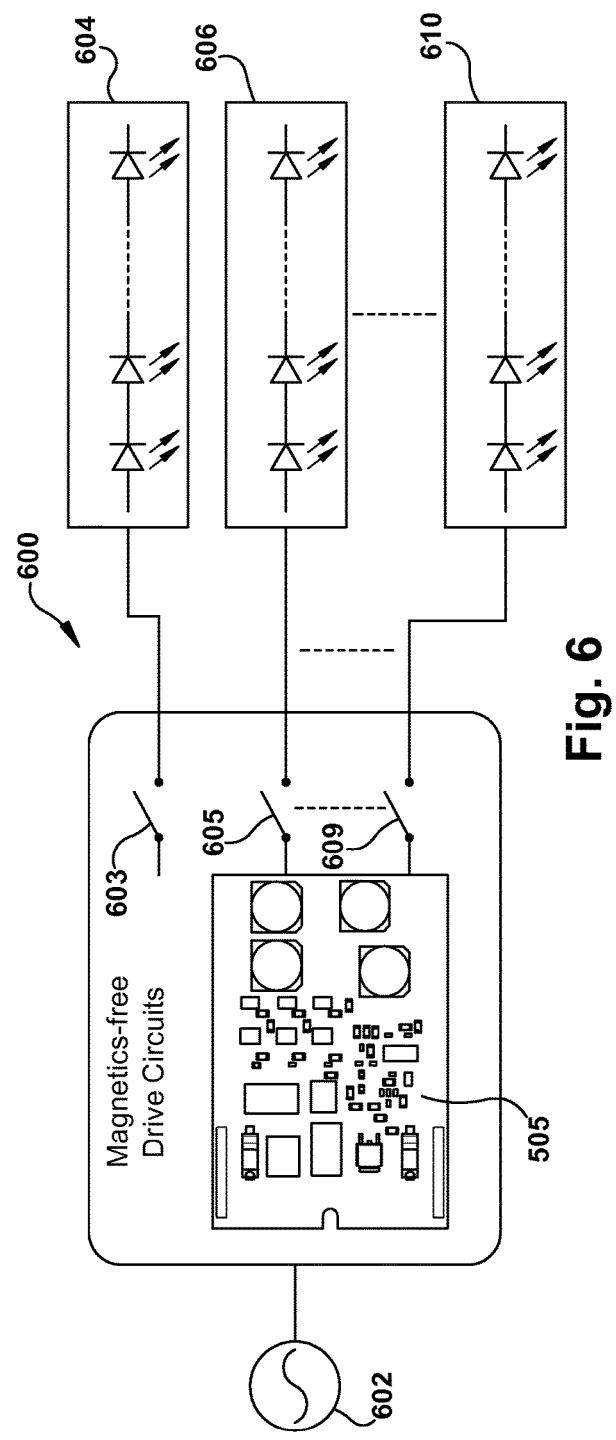
FIG. 6 is a schematic diagram of a modular integrated lighting circuit as described herein.

In other embodiments, the LED circuit board 108 and drive circuit 505 can be on separate electrically connected circuit boards. For example, as shown in FIG. 6, the LED light engine 500 can be formed as a modular integrated circuit 600, with a plurality of LED circuit boards (e.g., LED light strings 604, 606, 610). In this way, any one or more luminaires can be dynamically configurable without redesigning single "master" drive circuits used for an entire configuration. Accordingly, configurations with multiple LED circuit boards can be added, eliminated, altered, or scaled without significant redesign of a single "master" drive circuit for the entire configuration. Furthermore, the modular design of the LED light engine 500 and the modular integrated circuit 600 allow for drop-in replacement of one or more LED circuit boards into a luminaire without having to service or modify the drive circuit 505. Accordingly, a complexity of the luminaire can be reduced, lumen output levels of the luminaire can be adjusted, and various physical configurations of the luminaire can be achieved.

The modularity of the luminaire as described above facilitates modification to the overall design of the luminaire which contrasts sharply with conventional modular luminaires. In traditional modular luminaires, a drive circuit is inherently limited by some feature or property, e.g., voltage, wattage, current, and the like. As a result, the modularity of the luminaire is necessarily also limited. For example, a drive circuit may be capable of powering a 50 W luminaire. The 50 W luminaire may comprise two 25 W LED circuit boards, five 10 W LED circuit boards, or other such combinations to equal 50 W. However, if 50 W becomes insufficient and a higher wattage is desired from that luminaire, then the drive circuit would have to be re-designed to support the additional wattage. By contrast, the subject luminaire as described above provides the ability to change the number of LED circuit boards employed without altering the drive circuit. This is because each LED light engine 500 has a driving circuit region 503 and is designed for the LED light strings of the light emitting region 504, thereby eliminating the need for a global driving circuit that powers every light emitting region 504. Accordingly, a quantity of the LED light strings that may be used is independent (e.g., not limited by) the use of a particular driving circuit.

Still referring to FIG. 6 illustrates a schematic of the modular integrated circuit 600 including the plurality of LED light strings 604, 606, 610 controlled by the drive circuit 505. The drive circuit 505 receives an alternating current (AC) input 602 (e.g., from cable 118, not shown). The AC input 602 provides a main power for the drive circuit 505, and the drive circuit 505 is configured to convert the AC main power to direct current (DC) to drive the plurality of LED light strings 604, 606, 610. The drive circuit 505 can include a diode rectifier(s) and other electrical components configured to convert a power from the power input 602 to a power suitable for powering or driving the plurality of LED light strings 604, 606, 610. In some examples, the drive circuit 505 does not use transformers or inductors for the purpose of power or energy conversion. In other words, the drive circuit 505 does not utilize switched mode DC/DC converters that use inductors and/or transformers for power conversion. The plurality of LED light strings 604, 606, 610 are connected to the drive circuit 505 through respective semiconductor switches 603, 605, 609 so that a status (e.g. ON or OFF) of the semiconductor switches 603, 605, 609 can electrically connect a respective corresponding one or more of the plurality of LED light strings 604, 606, 610 to the drive circuit 505, in at least one of series and parallel. The drive circuit 505 can also have a current regulator for controlling current in the LED light strings 604, 606, 610.

The status of the semiconductor switches 603, 605, 609 can be dependent on a voltage of the AC input 602 at a specific time indicating which of the respective one or more of the plurality of LED light strings 604, 606, 610 will receive power from the AC input 602 at the specific time. For example, the number of LED light strings that are powered may be related to the AC input voltage. That is, according to one example, if the input is below 20 V, no LED light strings are powered; if the input is between 20 and 39 V, one LED light string is powered; if the input is between 40 and 59 V, two LED light strings are powered; if the input is between 60 and 79 V, three LED light strings are powered; and if the input is above 80 V, four LED light strings are powered. Thus, at any time, there can be no or any one or more of the plurality of LED light strings 604, 606, 610 connected to the drive circuit 505 via the corresponding semiconductor switches 603, 605, 609. Additionally, capacitors can store electrical energy to allow the LED light strings to remain illuminated during periods when the semiconductor switches are disconnecting the LED strings from the input power sources.

The semiconductor switches 603, 605, 609 may selectively provide power to the LED light strings 604, 606, 610 according to any circuit arrangement. For example, according to one embodiment, each semiconductor switch may be provided across (parallel to) a corresponding LED light string. In another embodiment, each semiconductor switch may connect a front (+) end of an LED light string to ground or an input of the current regulator. In yet another embodiment, each semiconductor switch may connect a back (−) end of an LED circuit string to the output of the drive circuit 505. In still another embodiment, a first semiconductor switch may be provided across (parallel to) a plurality of LED light strings, where additional semiconductor switches are provided across (parallel to) each of (or a subset of) the plurality of LED light strings. Still additional semiconductor switches may be provided across (parallel to) other LED light strings not enclosed by the first semiconductor switch. It is noted that still other arrangements may be used without departing from the scope of the present disclosure.

The magnetics-free drive circuit 505 can include high-efficiency components that reduce power loss and match an LED voltage in order to achieve greater efficiency. The LEDs 509 can also be arranged in a spaced relationship with respect to each other so as to evenly distribute heat that is generated by the LEDs 509 when powered or illuminated. Accordingly, a single LED light engine (e.g. the LED light engine 500) having, for example, a 40 W input power and high temperature components can operate with a circuit board temperature (e.g. a temperature of LED circuit board 108) greater than about 85° C. with a predicted lifetime of more than about 60,000 hours. The LED light engine 500 including the LED circuit board 108 and the modular integrated circuit 600 including the magnetics-free drive circuit 505 and the plurality of LED light strings 604, 606, 610 can also maintain a low-profile shape with respect to the luminaire (e.g. the first example luminaire 100, the second example luminaire 200, the third example luminaire 300, and the fourth example luminaire 400) in which the LED light engine 500 and/or the modular integrated circuit 600 are configured to be installed.

For example, the LED light engine 500 comprises the magnetics-free drive circuit 505 and an LED illumination circuit that provides power to the LED light strings 604, 606, 610. In various embodiments, the drive circuit 505 and the illumination circuit may be separated by regions on a single circuit board 108 as discussed above. However, in other embodiments, each circuit may be on separate circuit boards that are electrically connected. It is also noted that the geometry of the circuits and circuit boards is not limited to squares and rectangles. Rather, for example, the circuit boards and circuits thereon may take a round or circular shape. In still other embodiments, the circuits may be formed concentrically on either a single or separate circuit boards.

Furthermore, the configuration of the subject luminaire yields higher performance which may be the result of a higher power factor, lower total harmonic distortion, lower flicker, higher operation temperature, and/or higher reliability of components. Total harmonic distortion refers to a standard unit of a measure of the harmonic distortion of a signal present, defined as the ratio of the sum of all harmonic components to the fundamental frequency component. Flicker is generally characterized by flicker percentage and flicker index. The term "flicker percentage" refers to a measure of the depth of modulation of flicker. Similarly, the term "flicker index" refers to a measure of the light intensity cycle based on the comparative duration of high and low levels of light relative to the average intensity (e.g. accounting for different shapes or duty cycles that a periodic waveform can exhibit).

The LED light engine 500 and the modular integrated circuit 600 can be configured to have at least one of an output of at least 2000 lumens (e.g. lm+), a power factor greater than about 0.9, a total harmonic distortion of less than about 20%, a flicker percentage of less than about 40%, and a flicker index of less than about 0.15. The LED light engine 500 may achieve such results with a lifetime greater than about 60,000 hours at 85° C. across an entire input voltage range. For example, the power factor is greater than about 0.999, the total harmonic distortion less than about 1.5%, flicker percentage less than about 35%, and the LED light engine has a lifetime greater than about 60,000 hours at 85° C. across with an input voltage of 120 V AC±10% (108-132 V AC) or 230 V AC±10% (207-253 V AC). Such performance may be achieved according to the above and below described configuration of the drive circuit 505, while still maintaining the low profile (e.g., less than 1 inch) described herein. Typically, a luminaire profile was constrained by part size (e.g., required capacitors that have dimensions that restrict or prohibit a low-profile design) and desired lumen output. In particular, total harmonic distortion is reduced by matching LED light string voltage and input voltage with more LEDs (and/or LED light strings) powered at higher voltages. Furthermore, flicker is controlled by placing a parallel capacitor to each LED string.

In some examples, the LED light engine 500 and the modular integrated circuit 600 can have an outermost dimension (e.g. a height measured from a first outermost point on a first side to a second outermost point on a second side that is opposite the first side) of less than about one inch. In other examples, the LED light engine 500 and the modular integrated circuit can have an outermost dimension of less than about one inch such that an overall profile with respect to a height of the LED light engine and the modular integrated circuit board 600 fits within (e.g. entirely within) an area or space defined by the outermost dimension. This outermost dimension (e.g. height) of the LED light engine 500 and the modular integrated circuit 600 can be achieved when the magnetics-free drive circuit 505 and LEDs 509 are arranged on the same LED circuit board 108 (e.g. as illustrated in FIG. 5 with respect to the LED light engine 500) and/or when the magnetics-free drive circuit 505 is separate and electrically connected to a plurality of LED light strings 604, 606, 610 that are on separate circuit boards (e.g. as illustrated in FIG. 6 with respect to the modular integrated circuit 600). For purposes of this description, the outermost dimension (e.g. height) of the LED light engine 500 and the modular integrated circuit 600 is defined as a distance in a direction orthogonal to a face or surface of the substrate of the circuit board (e.g. LED circuit board 108 or a face or surface of any one or more of the plurality of LED light strings 604, 606, 610) on which the magnetics-free drive circuit 505 and/or the LEDs 509 are mounted.

For example, an outermost dimension can refer to a largest dimension of a component in a particular direction, such that all dimensions of the component with respect to that particular direction are less than or equal to the largest dimension. Thus, in some examples, the outermost dimension may define an overall profile dimension with respect to a particular direction within which one or more components or elements can fit. For example, an LED light engine 500, LED circuit board 108, drive circuit 505, or modular integrated circuit 600 with an outermost dimension of less than about one inch can refer to an LED light engine 500, LED circuit board 108, drive circuit 505, or modular integrated circuit 600 having an overall profile configured to fit within an area defined with respect to at least one particular dimensional direction by the outermost dimension of less than about one inch. In other examples, all components associated with the LED light engine 500, the LED circuit board 108, the drive circuit 505, or the modular integrated circuit 600 can have outermost dimensions such that all of the outermost dimensions are less than about one inch.

In another example, described with respect to the third example luminaire 300 shown in FIGS. 7 and 8, the third example luminaire 300 can include a clamping plate 375 configured to secure the LED circuit board 108 in the lighting compartment 304 of the third example luminaire 300. The clamping plate 375 can be arranged underneath the lens 312 of the third example luminaire 300 and can be configured to contribute to the low profile shape of the third example luminaire 300 as well as to protect sensitive electronic components (e.g. components arranged in wiring compartment 360 behind wall 330 and underneath wiring cover 314) from excessive heat while also permitting effective convection cooling of the third example luminaire 300. It is also to be understood that a same or similar clamping plate 375 could be used with other example luminaires, including the first example luminaire 100, the second example luminaire 200, the fourth example luminaire 400, as well as other luminaires including those not explicitly disclosed herein.

A cross-sectional view of the clamping plate 375 is illustrated in FIG. 8. The clamping plate 375 can be fabricated flat or planar and then can become curved during installation. For example, the clamping plate 375 can be located along opposite longitudinal sides of the lighting compartment 304. The clamping plate 375 can then be screwed into the base 301 of the third example luminaire 300 at the longitudinal sides of the lighting compartment 304 (e.g. toward the bezel rim 302), causing the clamping plate 375 to take on a curved profile or configuration. As the clamping plate 375 curves during installation, the clamping plate 375 applies a clamping force along edges of the LED circuit board 108, thereby securing the LED circuit board 108 to a bottom portion 305 of the base 301 of the lighting compartment 304. The clamping plate 375 can thus eliminate a need for fasteners on the surface of the LED circuit board 108 otherwise required to secure the LED circuit board 108 to the third example luminaire 300. The clamping plate 375 can also simplify placement of components and can reduce a required surface area of the LED circuit board 108. In some embodiments, the clamping plate 375 may extend the entire length of the luminaire 300, across a plurality of LED circuit boards 108. In still other embodiments, a plurality of clamping plates 375 may each extend for only a portion of the length of luminaire. In such a case, the clamping plates may be provided adjacent to each other so as to provide the same effect as a single clamping plate 375 extending the entire length of the luminaire 300.

It is also noted that a base of the lighting compartment 304 may serve as a heatsink for removing heated air from the luminaire 300 (as described in more detail below). Thus, by securing LED circuit board 108 to the lighting compartment 304, the clamping plate 375 also provides enough force to create a contact area between the LED circuit board 108 and the lighting compartment 304. Heat can therefore be transferred between the LED circuit board 108 and the lighting compartment 304. As described below, the lighting compartment 304 is exposed to a gap in a split fin structure 425 of the luminaire 300 that allows the flow of heat outwardly from the center of the luminaire 300. In sum, heat generated by LED circuit board 108 may thus be efficiently removed from the luminaire 300. The pressure required to create such contact can be achieved using the above described clamping plate 375.

In other examples, the clamping plate 375 can be configured to be reflective or to include a reflective coating so as to improve optical efficiency by redirecting light 380 in a direction normal to a reflective surface 376 of the curved clamping plate 375. Furthermore, the curved shape of the reflective surface 376 of the clamping plate 375 directs a mounting hole 377 and a corresponding fastener 378 laterally, toward the bezel rim 302 of the third example luminaire 300. As a result, the base 301 can include less material (e.g. in the bottom portion 305) and the LED circuit board 108 can be secured to the base 301 without the need to make blind tapped holes beneath the LED circuit board 108. The clamping plate 375 thus also contributes to the low-profile design of the third example luminaire 300. In still other embodiments, the clamping plate may serve as a ground path for any electronics of the luminaire 300 or LED circuit boards 108.

Turning to FIG. 9, the fourth example luminaire 400 can include a split fin structure 425 that is configured to permit or increase natural convection of heat from the base 401 and/or the bezel rim 402 of the fourth example luminaire 400. The split fin structure 425 can be cast, machined, or otherwise fabricated. It is also to be understood that a same or similar split fin structure 425 could be used with other example luminaires, including the first example luminaire 100, the second example luminaire 200, the third example luminaire 300, as well as other luminaires including those not explicitly disclosed herein. In addition, the split fin structure 425 is configured to permit heated air to exit the ends of the fourth example luminaire 400, for example as illustrated by arrows 427 in FIG. 10. For example, the split fin structure 425 allows heated air to flow outwardly from the center of the luminaire 400 toward opposite ends where the fin is opened. The split fin structure 425 can include channels 408 in the bezel rim 402 along each side of the fourth example luminaire 400 through which air can pass to increase a transfer of heat from the fourth example luminaire 400 to the atmosphere or environment in which the luminaire is located. The channels 408 are configured to provide additional surface area and pathways for hot air to escape the fourth example luminaire 400, thereby providing a low-profile luminaire configured to be employed in high ambient or other temperature-sensitive environments. The channels 408 can be a consistent or uniform size, or be of a varying, graduated size corresponding to a size and shape of the bezel rim 402. Further, the bezel rim 402 is curved upward to provide a gap between a ceiling or wall to which the luminaire 400 is mounted, and the body (or lighting compartment) of the luminaire 400 (which may serve as a heatsink for LED circuit boards). This gap provides the area through which heated air may flow outwardly from the center thereof, and from the channels 408. Nevertheless, it is noted that air may exit the luminaire 400 from according to any direction.

As shown in FIGS. 10-12, with respect to the fourth example luminaire 400, the fourth example luminaire 400 can also be mounted to a surface 700 (e.g. a wall or a ceiling) without additional mounting brackets and while still maintaining a low-profile. As depicted in FIG. 9, a plurality of bolts, screws, or other fasteners 465 can be passed through mount openings 466 (or the channels 408) in the base 401 or the bezel rim 402 of the fourth example luminaire 400. The fasteners 465 can be used to secure the fourth example luminaire 400 to the surface 700. As shown in FIGS. 10-12, the bezel rim 402 and split fin structure 425 provides a passage 705 for air to pass through and exit or dissipate away from the fourth example luminaire 400 as illustrated by arrows 426 and 427 in the figures. It is also to be understood that same or similar mount openings 466 and corresponding fasteners 465 could be used with other example luminaires, including the first example luminaire 100, the second example luminaire 200, the third example luminaire 300, as well as other luminaires including those not explicitly disclosed herein. Moreover, the first example luminaire 100, the second example luminaire 200, and the third example luminaire 300, can be configured to have the same or similar outermost dimension (e.g. height 475 FIG. 12) as described with respect to the fourth example luminaire 400. As a result of this and the other aspects described herein (either individually or in combination), a distance from an outermost face of the surface 700 to a bottom of the fourth example luminaire 400 (e.g. an outermost dimension of the luminaire) can be less than about two inches, or more particularly, less than about one and three-quarter inches, thereby providing a low-profile luminaire.

For example, any one or more of the first example luminaire 100, the second example luminaire 200, the third example luminaire 300, and the fourth example luminaire 400 can have an outermost dimension (e.g. a height 475 measured from a first outermost point on a first side to a second outermost point on a second side that is opposite the first side) of less than about two inches. In other examples, any one or more of the first example luminaire 100, the second example luminaire 200, the third example luminaire 300, and the fourth example luminaire 400 can have an outermost dimension (e.g. height 475) of less than about two inches such that an overall profile with respect to a height of any one or more of the first example luminaire 100, the second example luminaire 200, the third example luminaire 300, and the fourth example luminaire 400 fits within (e.g. entirely within) an area or space defined by the outermost dimension. For purposes of this description, the outermost dimension (e.g. height 475) of any one or more of the first example luminaire 100, the second example luminaire 200, the third example luminaire 300, and the fourth example luminaire 400 is defined as a distance in a direction orthogonal to an outermost face of the surface 700 to which the any one or more of the first example luminaire 100, the second example luminaire 200, the third example luminaire 300, and the fourth example luminaire 400 are mounted.

As noted, an outermost dimension can refer to a largest dimension of a component in a particular direction, such that all dimensions of the component with respect to that particular direction are less than or equal to the largest dimension. Thus, in some examples, the outermost dimension may define an overall profile dimension with respect to a particular direction within which a component can fit. For example, any one or more of the first example luminaire 100, the second example luminaire 200, the third example luminaire 300, and the fourth example luminaire 400 with an outermost dimension of less than about two inches can refer to any one or more of the first example luminaire 100, the second example luminaire 200, the third example luminaire 300, and the fourth example luminaire 400 having an overall profile configured to fit within an area defined with respect to at least one particular dimensional direction by the outermost dimension of less than about two inches.

While various features and aspects are presented above, it should be understood that the features may be used singly or in any combination thereof. Further, it should be understood that variations and modifications may occur to those skilled in the art to which the claimed examples pertain. The examples described herein are exemplary. The disclosure may enable those skilled in the art to make and use alternative designs having alternative elements that likewise correspond to the elements recited in the claims. The intended scope may thus include other examples that do not differ or that insubstantially differ from the literal language of the claims. The scope of the disclosure is accordingly defined as set forth in the appended claims.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget. Finally, the term "substantially," if used herein, is a term of estimation.

We claim:

1. A light emitting diode (LED) circuit board comprising:
a main power line passing directly from an input terminal to an output terminal, the main power line supplying a power to the input terminal and to the output terminal;
a plurality of LED strings, each LED string comprising at least one LED;
a plurality of semiconductor switches for controlling power to each of the plurality of LED strings based at least in part on a voltage of the power at the input terminal; and
a driving circuit configured to convert the power from the main power line and provide the converted power to the plurality of LED strings when a corresponding one or more of the plurality of semiconductor switches is electrically connected,
wherein the output terminal connects the main power line to and supplies the power to an input terminal of at least one other LED circuit board, and
wherein a quantity of the at least one other LED circuit boards is independent of the driving circuit of the LED circuit board and of the at least one other LED circuit board.

2. The LED circuit board of claim 1, wherein each of the plurality of semiconductor switches is connected in series with at least one of the plurality of LED strings and is configured to electrically connect or electrically disconnect the driving circuit and the at least one of the plurality of LED strings.

3. The LED circuit board of claim 1, wherein the driving circuit is configured to electrically connect in series to another driving circuit of another LED circuit board.

4. The LED circuit board of claim 1, wherein the driving circuit is configured to electrically connect in parallel to another driving circuit of another LED circuit board.

5. The LED circuit board of claim 1, wherein at least one of the LED strings comprises a plurality of LEDs connected in series.

6. A light emitting diode (LED) system comprising:
a power source configured to output a power;
a first LED circuit board comprising:
  a first input terminal supplied with the power;
  a first output terminal directly connected to the first input terminal and supplied with the power from the first input terminal;
  a first plurality of LED strings at least one LED;
  a first plurality of semiconductor switches for controlling power to each of the first plurality of LED strings based at least in part on a voltage of the power at the first input terminal; and
  a first driving circuit configured to convert power from the first input terminal and provide the converted power to the first plurality of LED strings when one or more of the first plurality of semiconductor switches is electrically connected;
a second LED circuit board comprising:
  a second input terminal supplied with the power through the first output terminal of the first LED circuit board;
  a second output terminal directly connected to the first input terminal and supplied with the power from the second input terminal;
  a second plurality of LED strings;
  a second plurality of semiconductor switches for controlling power to each of the second plurality of LED strings based at least in part on a voltage of the power at the second input terminal; and
  a second driving circuit configured to convert power from the first input terminal and provide the converted power to the first plurality of LED strings when one or more of the first plurality of semiconductor switches is electrically connected; and
a housing to which the first LED circuit board and the second LED circuit board are mounted.

7. The LED system of claim 6, wherein at least one of the LED strings of the first LED circuit board or the second LED circuit board comprises a plurality of LEDs connected in series.

8. A light emitting diode (LED) system comprising:
a first LED circuit board comprising a first driving circuit and a first plurality of LEDs;
a second LED circuit board comprising a second driving circuit and a second plurality of LEDs;
a main power supply line configured to supply power to both the first LED circuit board and the second LED circuit board, the main power supply line passing through an output terminal of the first LED circuit board and an input terminal of the second LED circuit board, wherein the first driving circuit and the second driving circuit convert power supplied by the main power supply line and provide the converted power to the first and second pluralities of LEDs, respectively, and the first driving circuit and the second driving circuit are connected in parallel.

\* \* \* \* \*

UNITED STATES PATENT AND TRADEMARK OFFICE
CERTIFICATE OF CORRECTION

PATENT NO. : 9,974,125 B2
APPLICATION NO. : 14/801908
DATED : May 15, 2018
INVENTOR(S) : Andrew Francis Scarlata and Hui Zhang It is certified that error appears in the above-identified patent and that said Letters Patent is hereby corrected as shown below:

On the Title Page

Item (*), Notice "by 0 days. days." should read --by 0 days.--

Signed and Sealed this
Twenty-fourth Day of July, 2018

Andrei Iancu
*Director of the United States Patent and Trademark Office*